No. 751,085. PATENTED FEB. 2, 1904.
L. P. LOWE.
APPARATUS FOR THE MANUFACTURE OF GAS.
APPLICATION FILED JUNE 17, 1903.
NO MODEL.

WITNESSES
K Lockwood-Nevins.
M. Stuart

INVENTOR
L. P. Lowe
By
Francis M. Wright.
Attorney.

No. 751,085. Patented February 2, 1904.

UNITED STATES PATENT OFFICE.

LEON P. LOWE, OF SAN FRANCISCO, CALIFORNIA.

APPARATUS FOR THE MANUFACTURE OF GAS.

SPECIFICATION forming part of Letters Patent No. 751,085, dated February 2, 1904.

Application filed June 17, 1903. Serial No. 161,793. (No model.)

*To all whom it may concern:*

Be it known that I, LEON P. LOWE, a citizen of the United States, residing at San Francisco, in the county of San Francisco and State of California, have invented certain new and useful Improvements in Apparatus for Gas Manufacture, of which the following is a specification.

My invention consists in an apparatus for heating a gas-generator simultaneously in opposite directions and subsequently manufacturing gas from hydrocarbon oils.

My invention embodies novel features, as will hereinafter be set forth and definitely claimed.

In the manufacture of oil-gases it is customary to heat a gas-generator in one direction only, and I have devised an improvement thereon whereby by the use of but one combustion-chamber I heat my gas-generator simultaneously in opposite directions. This I accomplish in an apparatus which I have devised and which is shown in the accompanying drawings.

Figure 1:
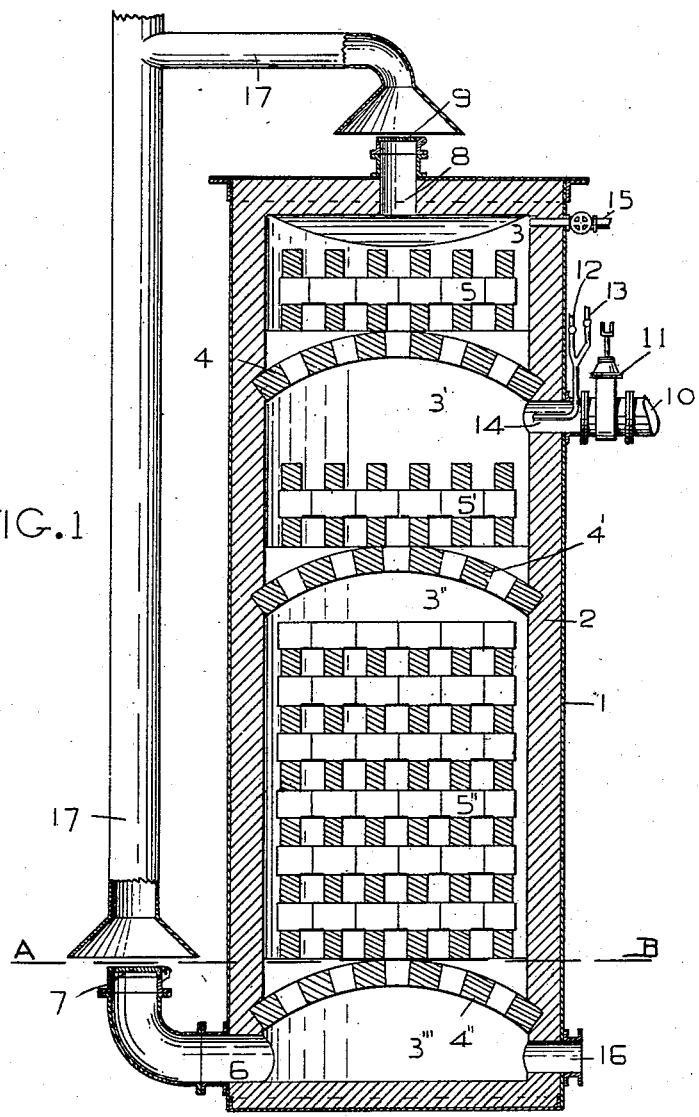
Figure 2:
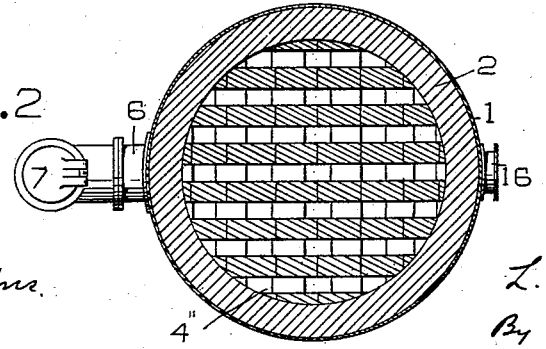

Figure 1 is a vertical sectional elevation of the apparatus embodying my invention. Fig. 2 is a sectional plan of same on line A B of Fig. 1.

Similar numerals of reference indicate corresponding parts in both figures.

1 is a shell or casing, preferably of cylindrical form and preferably composed of metal.

2 is a refractory lining of shell 1, preferably composed of fire-brick or other suitable substance.

3, 3′, 3″, and 3‴ are chambers contained within the shell 1 and lining 2.

4, 4′, and 4″ are arches separating chambers 3, 3′, 3″, and 3‴.

5, 5′, and 5″ are masses of loosely-piled refractory substances in the form of checkerwork, usually composed of ordinary fire-brick and contained within the chambers 3, 3′, and 3″.

6 is an outlet-opening at the bottom of chamber 3‴.

7 is a valve controlling opening 6.

8 is an outlet-opening at top of chamber 3.

9 is a valve controlling opening 8.

10 is an air-supply pipe entering chamber 3′.

11 is a valve controlling air-pipe 10.

12 is a suitably-controlled steam-pipe.

13 is a suitably-controlled oil-pipe.

14 is a hydrocarbon-injector.

15 is a suitably-controlled steam-pipe at top of chamber 3.

16 is a gas-outlet pipe at bottom of chamber 3‴.

17 is a stack or flue communicating with the atmosphere and is used for the purpose of conducting the products of combustion escaping from openings 6 and 8.

When I desire to put this apparatus into operation I proceed as follows: I open valves 7 and 9 and build a light fire in the chamber 3′, which I term a "combustion-chamber." This light fire serves to ignite hydrocarbons admitted through injector 14, the combustion of which is supported by air supplied in regulated quantities through pipe 10 and valve 11, the air supplied through pipe 10 being a forced blast derived from an air-blower in the usual manner. A portion of the products of combustion escape from the combustion-chamber 3′ in an upward direction into chamber 3, heating the loosely-piled refractory substance 5 contained therein, and finally escaping through outlet 8 and valve 9 into flue 17. A portion of the products of combustion likewise pass downward from the combustion-chamber 3′, heating the mass of loosely-piled refractory substance 5′ contained therein and through which they escape and pass through arch 4′ into chamber 3″, heating the mass of loosely-piled refractory substances 5″ contained within the chamber 3″. From chamber 3″ the products of combustion in their downward direction pass through arch 4″ into chamber 3‴, from whence they escape through opening 6 and valve 7 into flue 17. By regulating the openings 6 and 8 by the valves 7 and 9 I pass through each such relative portions as I desire of the products of combustion escaping from chamber 3′, that portion escaping through valve 9 going in an upward direction from chamber 3′, while the portion escaping through valve 7 passes in a downward direction from chamber 3′. When I have heated the masses of refractory substances 5, 5′, and 5″ to a sufficiently high degree, which can be observed through sight-holes conveniently placed in the chambers 3, 3', and 3", I cease the combustion of the hydrocarbon from the injector 14 and close the valve 11, controlling the air-supply pipe 10. I then close the valves 7 and 9, after which I admit steam through pipe 15 and hydrocarbon, preferably in the form of oil, through pipe 13, spraying the hydrocarbon by an admission of steam through pipe 12, if desired. The steam entering at pipe 15 passes downward over the surface of the refractory substances 5 contained within the chamber 3, whereby it becomes highly superheated, in which condition it enters the chamber 3' and comes in contact with the hydrocarbon vapors caused by the admission of the oil through pipe 13. Owing to the intense degree of heat contained within the refractory substances 5' a portion of the carbon of the oil is converted into solid form, usually in the condition of lampblack, the remainder of the oil being converted into the usual oil-gas. The superheated steam, lampblack, and oil-gas intermingle and pass downward over the surfaces of the refractory substances 5" contained within the chamber 3", the oil-gases being thereby converted into a fixed compound and the superheated steam and carbonaceous lampblack uniting to form the ordinary "blue water-gas," the resulting compound being a mixture of oil-gas and water-gas, which finally passes into chambers 3''' and escapes from outlet 16 to the usual washers, scrubbers, and purifiers in the customary manner. When the heats contained within the refractory substances 5, 5', and 5" have fallen to a temperature too low to properly conduct the gas-making operation, I cease same by discontinuing the supply of steam at pipes 15 and 12 and oil at pipe 13, and after properly opening valves 7 and 9 I restore the heats by creating combustion through the injector 14, supported by air admitted through pipe 10 and valve 11, as previously described, it being seen that the processes of heating and gas-making are alternate and intermittent. At such time as the heat radiated from the combustion-chamber 3' into chamber 3 is sufficient to properly heat the refractory substances 5, contained therein, I do not pass any of the products of combustion through opening 8 and valve 9.

Owing to the very high degree of heat necessary for converting a portion of the carbon of the oil into solid form the refractory substances 5' contained within the chamber 3' becomes impaired very much more quickly than do the refractory substances 5 and 5". I therefore so construct my gas-generator by forming it into the various separate chambers 3, 3', and 3", so that a relatively small amount of the refractory substance can be removed and replaced—as, for instance, 5'—without disturbing the major portion 5 and 5".

This gas-making apparatus can be of any convenient form and construction, and I do not limit myself to any particular design; but in ordinary operation I prefer the construction as shown.

I claim—

1. A shell having a mediate combustion-chamber nearer to one end of said shell than the other, loosely-piled refractory material between said chamber and each end of the shell, means for feeding fluid hydrocarbonaceous material and air into said combustion-chamber, flues leading from both ends of the shell whereby the products of combustion in said chamber are led in both directions through the shell, a steam-supply pipe at the end of the shell nearer the combustion-chamber, and a gas-outlet at the other end of the shell, substantially as described.

2. A shell having a mediate combustion-chamber nearer to one end of said shell than the other, loosely-piled refractory material between said chamber and each end of the shell, means for feeding fluid hydrocarbonaceous material and air into said combustion-chamber, flues leading from both ends of the shell and uniting outside the shell whereby the products of combustion in said chamber are led in both directions through the shell, a steam-supply pipe at the end of the shell nearer the combustion-chamber, and a gas-outlet at the other end of the shell, substantially as described.

3. A shell having means, located mediately thereof and nearer one end of the shell than the other, for feeding fluid hydrocarbon and air into said shell, open arches in said shell above and below the feeding means, forming a combustion-chamber thereat, and large and small heating-chambers between the combustion-chamber and the ends of the shell, loosely-piled refractory material in said chambers, flues leading from both chambers, whereby the products of combustion from the combustion-chamber pass in both directions therefrom, a steam-inlet pipe leading into the small heating-chamber, and a gas-outlet pipe leading from the large heating-chamber, substantially as described.

4. A shell having a mediate combustion-chamber, loosely-piled refractory material between said chamber and each end of the shell, means for feeding fluid hydrocarbonaceous material and air into said combustion-chamber, flues leading from both ends of the shell directly into the atmosphere whereby the products of combustion in said chamber are led in both directions through the shell, a steam-supply pipe at one end of the shell and a gas-outlet at the other end of the shell, substantially as described.

In witness whereof I have hereunto set my hand in the presence of two subscribing witnesses.

L. P. LOWE.

Witnesses:
FRANCIS M. WRIGHT,
M. STUART.